Oct. 22, 1968   R. W. CORNELL   3,406,723
UNIVERSAL FLEXIBLE SUIT JOINT
Filed March 16, 1966   4 Sheets-Sheet 1

INVENTOR
ROBERT W. CORNELL
BY Finnegan & Henderson
ATTORNEYS

INVENTOR
ROBERT W. CORNELL
BY *Finnegan & Henderson*
ATTORNEYS

Oct. 22, 1968 — R. W. CORNELL — 3,406,723
UNIVERSAL FLEXIBLE SUIT JOINT
Filed March 16, 1966 — 4 Sheets-Sheet 4

INVENTOR
ROBERT W. CORNELL
BY *Finnegan & Henderson*
ATTORNEYS

United States Patent Office 3,406,723
Patented Oct. 22, 1968

3,406,723
UNIVERSAL FLEXIBLE SUIT JOINT
Robert W. Cornell, West Hartford, Conn., assignor to United Aircraft Corporation, East Hartford, Conn., a corporation of Delaware
Filed Mar. 16, 1966, Ser. No. 534,694
23 Claims. (Cl. 138—121)

ABSTRACT OF THE DISCLOSURE

A universal flexible suit joint is provided which can be utilized for both universal or multidirectional movements without substantial change in the internal volume of the joint and with low friction forces being encountered in the movement of the joint. The joint includes a flexible material formed into a tubular member extended along the length of the joint with the tubular member having an axis and a plurality of substantially circumferential wrinkles. A plurality of spaced hoops are mounted on the tubular member with the hoops being substantially concentric with the axis of the tubular member. Guides or eyelets are mounted on the hoops and a plurality of cords pass through the guides and around the tubular member, with each of the cords describing a substantially helical path.

---

This invention relates to universal flexible suit joints and more particularly to universal flexible pressurized suit joints which have low stiffness, are simple in construction, and can be used in both substantially uniform diameter and tapered joints.

In pressurized suits, for space or other requirements, it is necessary to have flexible joints in the suit which will permit freedom of motion of the body. Some of these joints such as the knee joint are unidirectional, whereas others are multidirectional or universal, such as the shoulder, hip or wrist joints. What is needed for a universal joint is a flexible joint that can bend in any azimuth and for which the bending load will be about the same for any azimuth position. It is important that such suit joints must be easy to move under pressure, i.e., they must have a low stiffness and give the desired degree of freedom and flexibility of movement to the wearer.

An inflated pressurized suit has a certain degree of inherent stiffness; that is, the suit is in equilibrium as long as it is straight, but when a suit joint is bent, the load that results from the change in internal volume of the joint must be overcome. This same load provides a constant force tending to straighten the suit joint. Hence, work is required to bend the joint and except for friction effects a constant force must be exerted to maintain the joint in the bent position. When this force is relaxed, the suit joint will tend to straighten out.

One primary purpose of an efficient pressurized suit joint is to reduce to a minimum the work that must be done by the man wearing the suit to move about with the suit on, i.e., the work required to overcome the load imposed by the spacesuit itself should be a minimum. The two main components of work required to bend a suit joint are:

(1) the component imposed by a change in the volume caused by bending the joint; and
(2) the component needed to overcome friction occurring during bending.

Accordingly, it is advantageous to keep the change in volume and the friction imposed by the joint as low as possible.

There are now available a number of unidirectional joints that have low stiffness. However, even some of these joints have unstable characteristics when deflected. Past efforts have been unsuccessful in developing an efficient universal flexible suit joint having low stiffness and simple construction.

Accordingly, it is a primary object of this invention to provide a new and improved universal flexible suit joint that minimizes the work required of the wearer in moving about.

Another object of this invention is to provide a new and improved universal flexible suit joint which will permit freedom of motion of the body.

A further object of this invention is to provide a new and improved universal flexible suit joint which has low stiffness and which may be easily moved when the suit is pressurized.

A further object of this invention is to provide a new and improved universal flexible suit joint which is simple in construction.

A further object of this invention is to provide a new and improved universal flexible suit joint which may be used with tapered joints.

Another object of this invention is to provide a new and improved universal flexible suit joint which provides as small a change in volume in the suit as possible when the suit joint is bent.

Another object of this invention is to provide a new and improved universal flexible suit joint which has low friction when the joint is bent.

Additional objects and advantages of the invention will be set forth in part in the description that follows, and in part will be obvious from the description, or may be learned by practice of the invention, the objects and advantages being realized and attained by means of the instrumentalities and combinations particularly pointed out in the appended claims.

To achieve the foregoing objects in accordance with its purposes as here embodied and broadly described, the universal flexible suit joint of this invention comprises a flexible material forming a tubular member extending along the length of the joint, the tubular member having an axis and a plurality of substantially circumferential wrinkles, a plurality of spaced hoops mounted on the tubular member, a plurality of spaced guide means mounted on each of the hoops and a plurality of cords passing through the guide means and around the tubular member in a helical path. The ends of the cords may be secured to the guide means at one end or both ends of the joint but preferably are secured to each other to form a continuous loop. In the preferred embodiment the tubular member is in the form of a hollow bellows. Preferably the joint also includes means extending around the joint to cover the outside of the joint.

The invention consists in the novel parts, constructions, arrangements, combinations, and improvements shown and described.

The accompanying drawings, which are incorporated in and constitute a part of this specification, illustrate certain preferred embodiments of the invention and, together with the description, serve to explain the principles of the invention.

It is to be understood that both the foregoing general description and the following detailed description are exemplary and explanatory but are not restrictive of the invention.

Reference will now be made in detail to the present preferred embodiments of the invention, examples of which are illustrated in the accompanying drawings.

Figure 1:
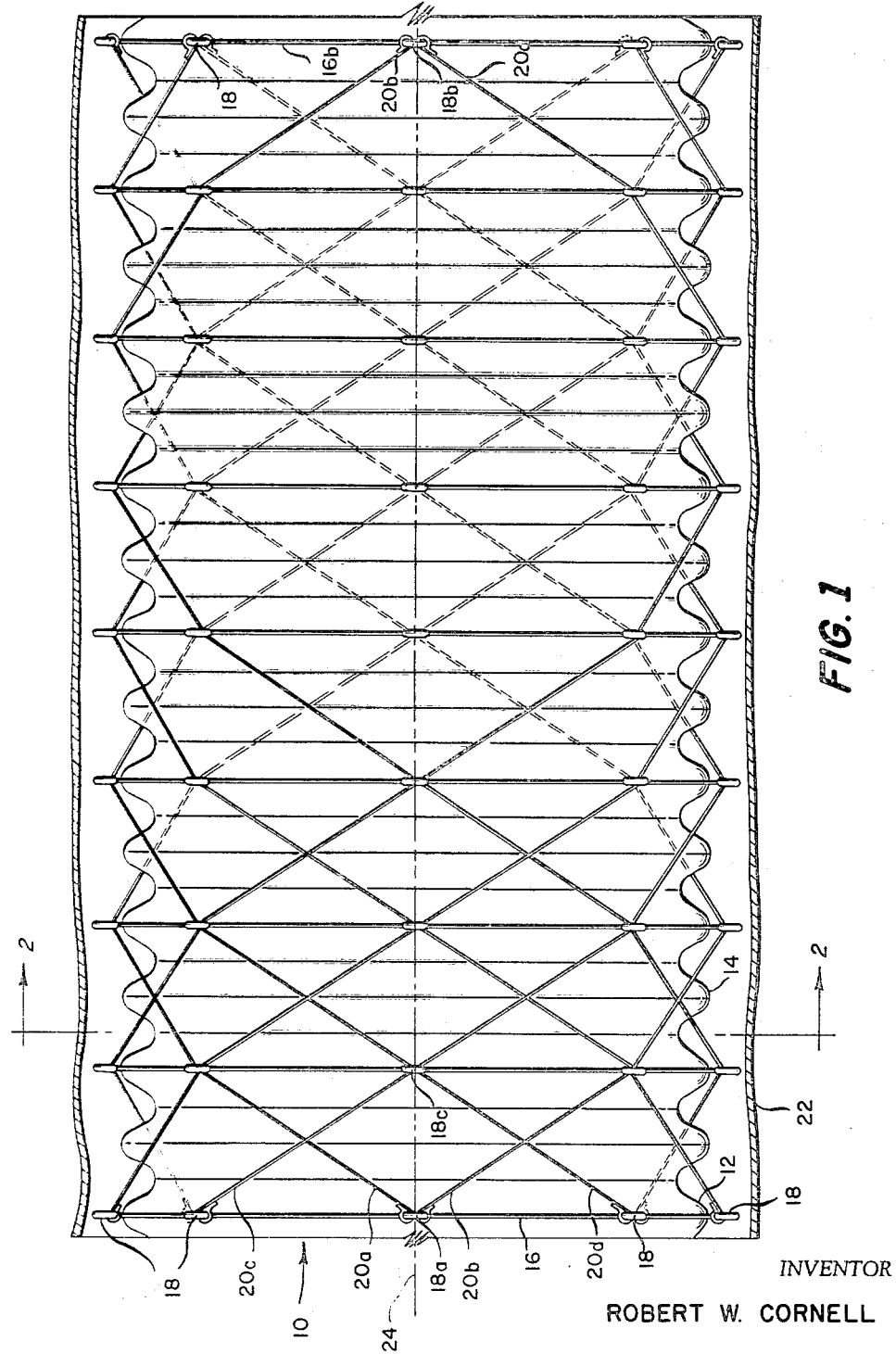
FIG. 1 is a side view, partially in section, of one embodiment of a joint constructed in accordance with the teachings of this invention.
Figure 2:
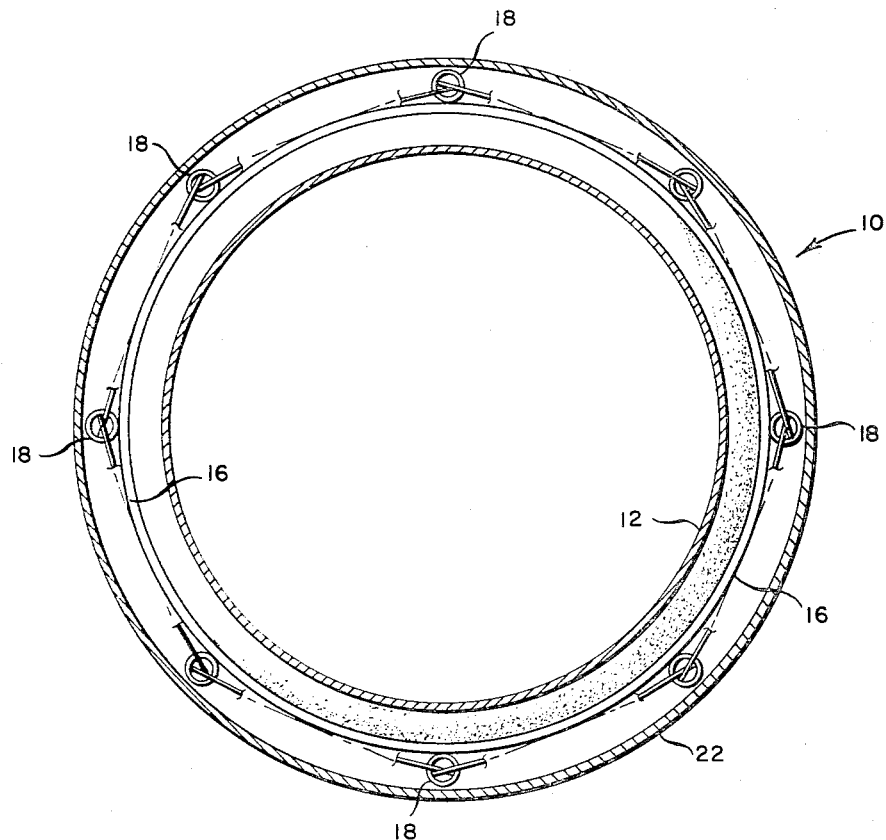
FIG. 2 is a vertical section of the joint of FIG. 1 taken along lines 2—2 of FIG. 1.
Figure 3:
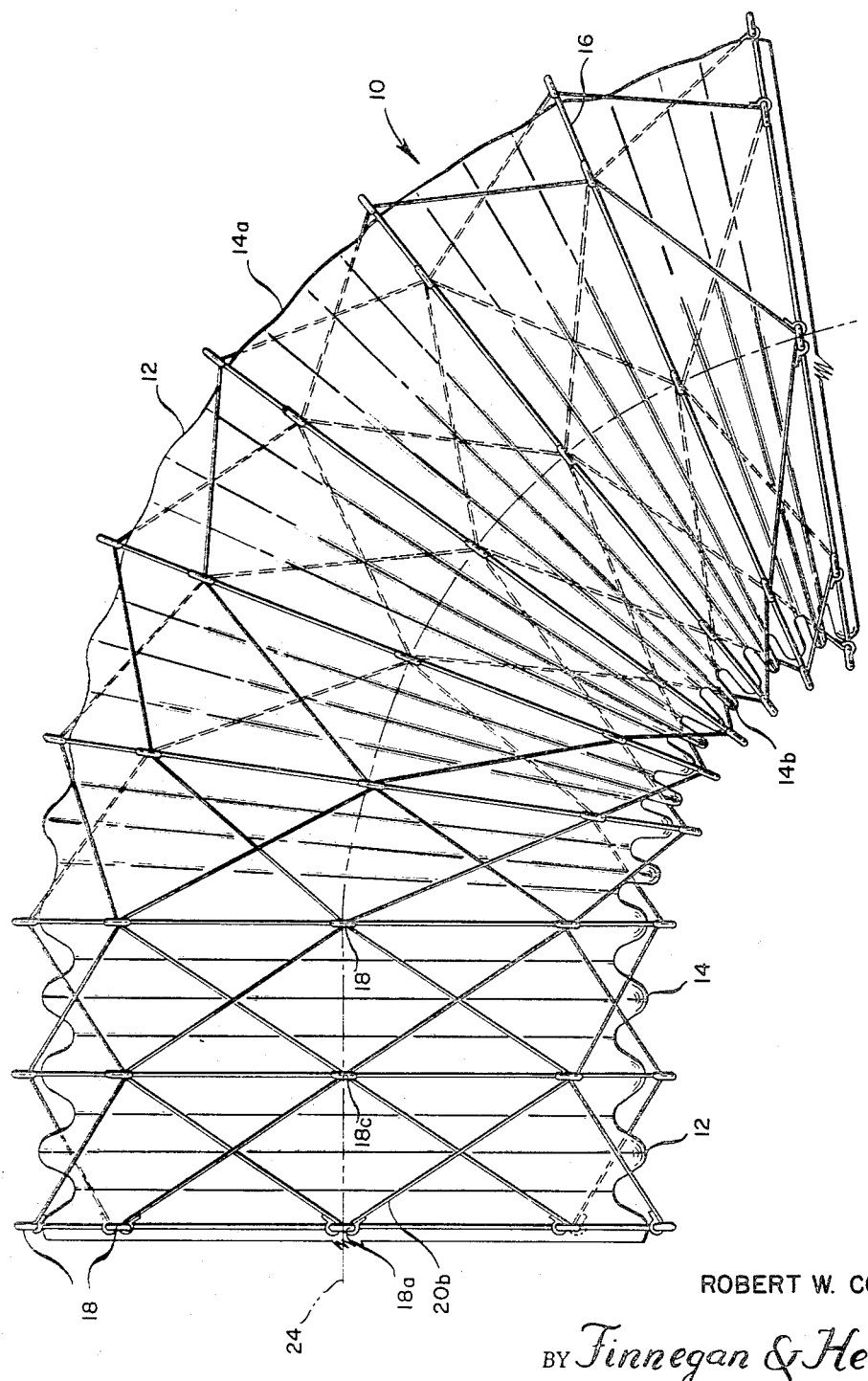
FIG. 3 is a side view of the joint of FIG. 1 in the bent position.

Referring to the embodiment illustrated in FIG. 1-3, it may be seen that the joint, generally 10, is substantially cylindrical in shape and is hollow to permit the joint to be attached, in any conventional manner, at each end to a pressurized suit with the joint of the wearer extending through joint 10.

In accordance with the teachings of the invention a hollow flexible convoluted material is provided which extends along the length of the joint and has a plurality of substantially circumferential convolution. The convoluted material serves to seal the joint and to hold and space the other members of the joint.

As here embodied, the convoluted material is a bellows 12 substantially cylindrical in shape and having a plurality of circumferential convolutions 14. Bellows 12 may be constructed by any flexible material which will seal the pressure within the pressurized suit.

Desirably, the bellows may be made of rubber which has the advantage of not only acting as a sealer to seal the pressure within the spacesuit but also as being merely a continuation of the material constituting the suit. The bellows may also be comprised of a fabric with a rubber liner in which case it is desirable that the warp of the fabric be circumferentially orientated so that the more flexible direction of the fabric is axial, and the fabric is capable of hoopwise restraint of the internal pressure.

In accordance with the invention, a plurality of spaced hoops are mounted on the bellows to maintain the shape of the joint, to prevent the joint from collapsing under deformation, and to support the hoopwise bursting pressure load on the flexible bellows. The hoopwise bursting pressure load is the load created by the internal pressure within the pressurized suit, which has been generally standardized at about 3.7 p.s.i.g. Normally, the hoops are of a rigid material such as metal or stiff plastic. If the hoopwise bursting pressure load is greater than the helical cord tensile reaction tending to collapse the joint of the suit when the joint is bent, it is possible to use a flexible material such as a fabric or cord.

The hoops may be attached to the bellows in any conventional manner. Preferably they are sewn into the bellows material itself or are sewn to the outside or inside of the bellows.

As here embodied, the hoops 16 are rigid and substantially circular. As may be seen hoops 16 are equally spaced on the outside of bellows 12 with a convolution 14 of bellows 12 between each of hoops 16. However, the orientation of the convolutes relative to the hoops is not an essential characteristic of this joint which could utilize any of a number of bellows-like liners. The liner could be more like a wrinkled tube than a well-formed bellows.

In accordance with the invention, guide means are mounted on the hoops for slidably securing cords to the hoops. The guide means are preferably eyelets but may also be ferrules or pulleys. It is also preferred that the eyelets be made of Teflon or a similar material to minimize friction as much as possible. It is further preferred that the guide means be spaced uniformly on the hoops and that the guide means be in the same relative circumferential position on each hoop.

As here embodied, the guide means comprise Teflon eyelets 18 secured (by sewing or other conventional means not shown) to the outer periphery of each hoop 16. As may be best seen in FIG. 2, there are eight equally spaced eyelets 18 on each hoop 16, and as may be best seen in FIGS. 1 and 3, eyelets 18 are at the same circumferential position on each of hoops 16. The joint could also be made using four equally spaced eyelets on each hoop and eliminating half the cords. Greater or lesser numbers of cords are also possible.

In accordance with the teachings of this invention a plurality of cords are provided which pass through each guide means and around the bellows in a substantially helical path with the ends of the cords being secured to the guide means at each end after one 360° revolution as shown in FIG. 1. These ends could be tied to each other to form a continuous loop of two revolutions. The cords are preferably of a woven, low stretch nylon or a woven combination of nylon and Teflon. Any material could be used, however, as long as it has the characteristics of low friction, low lengthwise flexibility and durability.

Two opposite helical directions of the cords as they pass around the joint gives the joint torsional stability and cause the cords to form a symmetrical mesh or network around the joint. It is desirable that the helix formed by each cord be shallow to minimize the friction load between the cords and eyelets. The cords should be so arranged that each cord will have the same length on each side of the neutral axis (that axis passing through the center of the joint) of the joint. This arrangement insures that when the joint is bent, the shortening of the cord in the sections of the joint on one side of the neutral axis is balanced by the lengthening of the same cord in the sections on the other side of the neutral axis.

This changing of the length of the cord on opposite sides of the neutral axis permits the bellows to contract on one side of the joint an amount proportionate to the shortening of the cord on that side of the joint and to expand on the other side of the joint an amount proportionate to the lengthening of the cord on that side of the joint. This simultaneous compression and expansion of the bellows maintains a substantially constant volume within the suit joint and thus substantially reduces the stiffness in the suit by minimizing one of the two main components of work necessary to bend a joint, i.e., that component imposed by the change in volume.

As the joint bends a portion of the cord length is transferred from segments on one side of the neutral axis through the eyelets to the adjacent segments on the other side of the neutral axis. Since each cord has only a portion of its cord length being transferred and this transfer is only to nearby segments a minimum of sliding motion occurs. Previous joints have utilized parallel lengthwise cords wherein the shortening on one side accumulates and must be totally transferred to the other side of the neutral axis through pulleys at one end of the joint. The length of cord sliding through the eyelet or pulley times the friction force represents friction energy consumed. The friction force is proportional to the normal force at contact between the eyelet and the cord. Since both the normal force and the length of cord are reduced in the joint of this invention, much less energy is consumed when the joint is bent.

As here embodied, joint 10 has sixteen (16) cords 20. Each of the cords 20 makes one (1) helical turn about the joint and is secured to an eyelet 18 on a hoop 16 at each end of the joint. Preferably, the cords are tied to the eyelet; however, they may be secured in any conventional manner. They may also be secured to each other thus running through the end eyelets and forming a continuous loop.

On each of the end hoops 16a and b, as shown in FIG. 1, two cords will be secured to each of the eyelets 18 or joined to each other. The two cords extend from the eyelet in opposite directions, one in a clockwise direction and the other in a counterclockwise direction. This is perhaps best illustrated in FIGS. 1 and 3 by cords 20a and 20b extending from eyelet 18a. Looking at joint 10 from the left end, it may be seen that cord 20a extends from eyelet 18a and makes a complete helical turn about joint 10, in a counterclockwise direction, ending at eyelet 18b on hoop 16b at the other end of joint 10. Cord 20b extends from eyelet 18a and makes a complete helical turn about joint 10 in a clockwise direction also ending at eyelet 18b on hoop 16b at the other end of joint 10.

It is to be understood that there are two cords secured to each of the eyelets at each end of the joint. A number of cords have purposely been omitted from the drawing to avoid confusion the illustration with unnecessary details.

Referring again to cords 20a and 20b, it may be seen that as these cords pass from hoop to hoop, they pass in a helical path through successive eyelets on each of the hoops. The location of the eyelets 18 causes each cord to describe a helical path. It may also be observed that each cord has one-half of its helical turn on each side of the joint, i.e., with the joint straight each cord has equal length above and below any plane through the neutral axis.

In FIGS. 1 and 3, the portion of the turn of each cord on the front side of the joint is shown in full lines, and the portion of the turn of each cord on the rear side of the joint is shown in broken lines. It is evident from the drawings that each of eyelets 18 of interior hoops 16 of joint 10 has two cords passing through it. In FIG. 2 the sectioned cords are shown in full lines as they enter the eyelets and for clarity, as broken lines as they leave the eyelets and pass to the next hoop. Referring again to FIG. 1, cords 20c and 20d both pass through eyelet 18c, cord 20c extending in a clockwise direction and cord 20d extending in a counterclockwise direction. Dual opening eyelets are preferred in order to separate the cords as they cross so as to reduce friction.

As a result of the triangular network formed by the helical cords 20, as they pass through eyelets 18 of hoops 16, the hoops 16 will tend to be positioned uniformly. This positioning of hoops 16 by cords 20 prevents the piling up or telescoping of hoops 16 when the joint is bent by keeping the hoops spaced from one another.

In accordance with a preferred embodiment of this invention, covering means are provided to extend around the joint and along the entire length of the joint to protect the eyelets, hoops and cords.

As here embodied, the covering means is comprised of a substantially cylindrical flexible cover 22 extending completely along and around joint 10. This cover 22 may be of any desired material such as a fabric so long as it is sufficiently flexible not to interfere with the operation of the joint.

The positioning of cords 20 of joint 10 is such that the cords will always tend to equalize about the normal axis 24 passing through the center of the joint. Thus, when the joint is bent a cord on one side of the neutral axis will be shortened by the same amount that it is necessary that it be lengthened on the other side of the neutral axis.

The operation of joint 10 may be seen in FIG. 3. The joint has been bent downwardly about an axis perpendicular to normal axis 24 of the joint which also forms the neutral axis in the bent position. Generally the neutral axis would be a circular sector in this view but not necessarily so depending on the manner of external load application. Viewing a typical cord 20b it may be seen that the cord is shortened at its lower side where hoops 16 and consequently successive eyelets 18 through which cord 20b passes are closer together. On the upper side of the joint, cord 20b is lengthened since adjacent hoops 16, and hence successive eyelets 18 through which the cord must pass, are farther apart. This lengthening of cord 20b on the upper side is substantially equivalent to the shortening of cord 20b on the lower side. Thus, cord 20b simply slides through eyelets 18 to adjust itself accordingly.

As a result of the movement of the cords, bellows 12 is free to expand on the upper portion of the joint smoothing out convolutions 14a and to contract on the lower portion of the joint accentuating convolutions 14b. By thus permitting the bellows to expand on the upper side and contract on the lower side, the joint maintains a substantially constant volume and is free of the stiffness ordinarily encountered in joints in which the wearer must perform work to change the internal volume of the joint while he is bending the joint.

The force of cords 20 acting on eyelets 18 also prevents hoops 16 from collapsing on the inside of the bend. Thus, as may be seen, the lower ends of the hoops are still spaced apart by small distances, while the upper ends of the hoops are spaced apart by proportionately greater distances.

Preferably, the number of cords, the number of hoops, and the number of eyelets on each hoop are interrelated. Thus the number of cords is such that there are twice (or multiples of two times) as many cords as there are eyelets or spaces between the hoops—there being one more hoop than there are numbers of spaces. Because of this interrelation each cord makes an integral number, usually one, of complete turns about the joint ending up at the opposite end of the joint in the same circumferential position as it started. In the embodiment in FIGS. 1–3, there are nine (9) hoops and eight (8) spaces between the hoops. Thus there are eight (8) eyelets on each hoop, sixteen (16) cords secured to the eyelets, and each cord makes one (1) complete turn about the joint.

Figure 4:
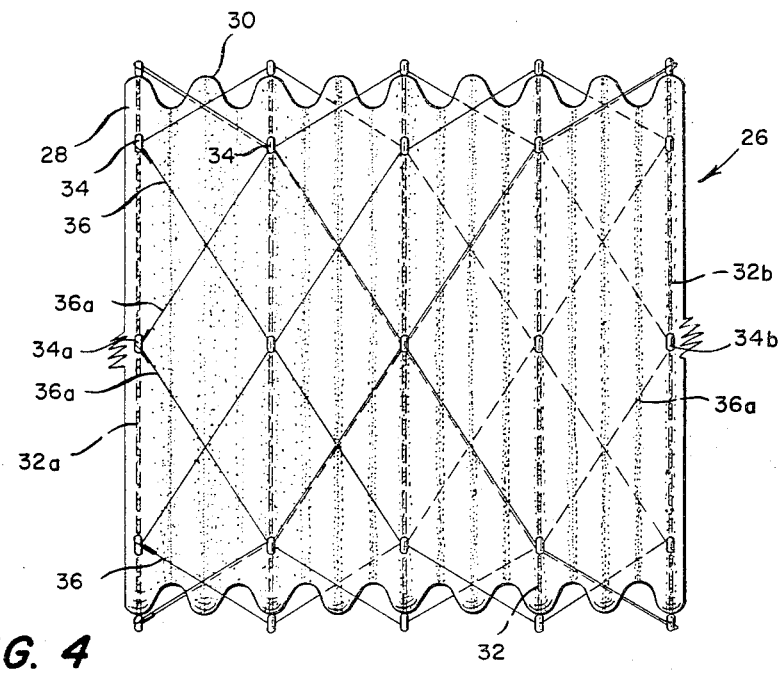
FIG. 4 is a side view of another embodiment of a joint constructed in accordance with the teachings of this invention.

Another embodiment of the present invention is illustrated in FIG. 4. The joint, generally 26, has a bellows 28 with a plurality of convolutions 30. A plurality of spaced hoops 32 are mounted internally of bellows 28 with the hoops being secured to the bellows in a conventional manner as by sewing (not shown). A plurality of spaced eyelets 34 are mounted on the periphery of hoops 32. Eyelets 34 extend through small openings in bellows 28 which openings are sealed to maintain the pressure within bellows 28.

A plurality of cords 36 are mounted in eyelets 34. In this embodiment each of cords 36 makes a one-half helical turn as it passes from the eyelets on hoop 32a on one end of joint 26 to the eyelets on hoop 32b on the other end. Cords 36 then loop through eyelets 34 on the last hoop 32b of joint 26, make another half helical turn about the other side of joint 26, and return to the same eyelet from which they started. The ends of each cord are then tied to each other at or near an eyelet on hoop 32a to form a continuous loop. Alternatively both ends of each cord could be tied to the same eyelet on hoop 32a rather than being tied together.

A typical cord 36a has a first end at eyelet 34a on hoop 32a. Cord 36a then extends in a half helical turn in a clockwise direction passing through successive eyelets 34 on successive hoops 32 until it reaches eyelet 34b on end hoop 32b. Cord 36a then loops through eyelet 34b and continuing in its clockwise direction makes another half helical turn passing through successive eyelets 34 on successive hoops 32 until it returns to eyelet 34a. The second end of cord 36a then loops through eyelet 34a and is secured to the first end. Each of cords 36 thus makes a complete turn as it passes in a helical path from one end of the joint to the other and then back to the first end.

This joint operates in a manner similar to that of the embodiment illustrated in FIGS. 1, 2, and 3. When joint 26 is bent, any shortening of a cord 36 on one side of the neutral axis will be compensated for by a lengthening of the same cord on the other side of the neutral axis with the cord sliding through eyelets 34 to make the proper adjustment. This adjusting of cords 36 permits bellows 28 to be expanded on one side of the joint by substantially the same amount as it is compressed on the other side of the joint. Thus, a substantially constant volume is maintained in the interior of bellows 28 with a minimum of sliding of the cords in the eyelets.

This embodiment has the advantage of being usable on shorter joints since it permits more flexibility in the number of spaced hoops needed for one joint.

Figure 5:
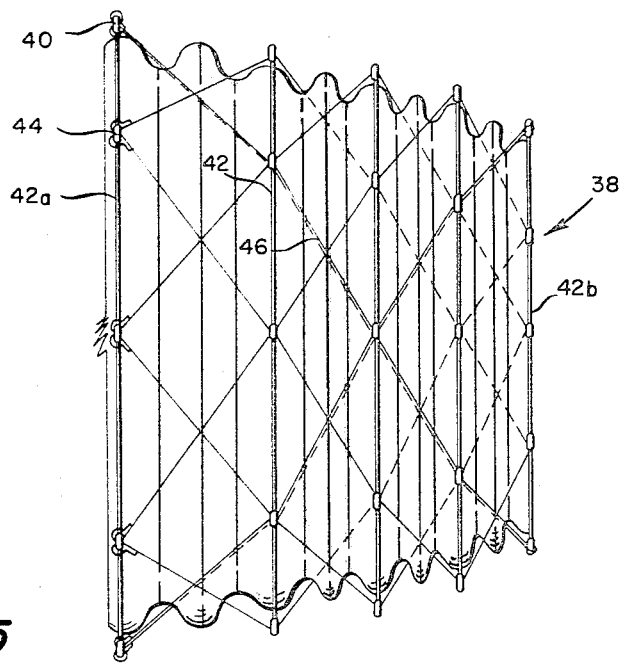
FIG. 5 is a side view of another embodiment of a joint constructed in accordance with the teachings of this invention.

Another embodiment of the invention is illustrated in FIG. 5. In this embodiment, the joint, generally 38, is tapered. The bellows 40 has the shape of a truncated cone and decreases in diameter from left to right. The hoops 42 are of various diameters with the diameter of each hoop being proportional to the diameter of the bellows at the location of the hoop. Unlike the previous embodiments hoops 42 are not equally spaced when pressurized but are progressively closer together as they decrease in diameter. Each hoop will be located in a position which establishes equilibrium between pressure loads and cord loads applied to the hoop. The eyelets 44 on each of hoops 42 are equally spaced but on the smaller hoops the eyelets are proportionately closer together as a result of the decreased diameter of the hoops.

Each of cords 46 has both of its ends secured to the same eyelets 44 on end hoop 42a. Each of cords 46 extends in half a helix about the joint, is looped through an eyelet 44 on the other end of hoop 42b and returns back to the eyelet on the first hoop 42a. Alternatively the cord ends may be joined to each other to form continuous loops rather than being secured to the eyelet.

Tapered joint 38 operates in a manner similar to that of the joint 26 illustrated in FIG. 4. A bend in any direction of joint 38 will cause a shortening of a cord on one side of the joint with a corresponding compression of the bellows on that side of the joint, and a lengthening of the cord on the other side of the joint with a corresponding expansion of the bellows on that side of the joint. This relative expansion and contraction of the bellows permits the bellows to maintain essentially a constant volume within the joint. Cords 46 acting through eyelets 44 tend to hold hoops 42 in position and prevent hoops 42 from collapsing or telescoping together on the inside of the bend when joint 38 is bent. This feature is of particular importance in a taperd joint.

In accordance with the invention, a new and improved universal flexible suit joint for pressurized suits has been provided. This joint can be utilized for both universal or multidirectional movements without substantial change in the internal valume of the joint and with low friction.

By maintaining substantially constant volume and by minimizing the amount of cord travel through eyelets during bending of the joint, the joints of this invention virtually eliminate the two main components of work required to move joints in pressurized suits; that is, the component of work required to cause a change in volume of the pressurized air in the spacesuit and the component of work required to move cords through eyelets or pulleys against the frictional force of the eyelet or pulley. Additionally, the helical orientation of the cords minimizes the radial bearing load at the eyelets and thereby minimizes the frictional force or work. By eliminating these work components, the present invention provides a joint of substantially decreased stiffness and gives the user a freedom of movement heretofore unobtainable in a pressurized suit.

It is contemplated within the scope of this invention that torsional flexibility of the joint can be achieved by leaving the ends of the helical cords free, that is, not attached to the guides at one or both ends. In his manner the ends of each cord are tied together to form a continuous loop.

The invention in its broader aspects is not limited to the specific details shown and described, but departures may be made from such details within the scope of the accompanying claims without departing from the principles of the invention and without sacrificing its chief advantages.

What is claimed is:

1. A universal flexible suit joint for pressurized suits comprising:

a flexible material formed into a tubular member extending along the length of the joint, the tubular member having an axis and a plurality of substantially circumferential wrinkles;

a plurality of spaced hoops mounted on the tubular member, the hoops being substantially concentric with the axis of the tubular member;

a plurality of spaced guide means mounted on said hoops; and a plurality of cords passing through the guide means and around the tubular member, each of said cords describing a substantially helical path.

2. The joint of claim 1 including covering means extending around the outside of the joint.

3. The joint of claim 1 wherein the guide means are eyelets.

4. The joint of claim 1 wherein each cord passes through one guide means on each hoop and one end of each cord is secured to a guide means at each end of the joint.

5. The joint of claim 4 wherein each cord makes an integral number of complete turns about the tubular member.

6. The joint of claim 4 wherein each cord makes one complete turn about the tubular member.

7. The joint of claim 1 wherein each cord passes through at least one of the guide means on each of the hoops, makes a one-half helical turn about one side of the tubular member, then turns around and makes a one-half helical turn back about the other side of the tubular member.

8. The joint of claim 7 wherein both ends of each cord are secured to the same guide means.

9. The joint of claim 7 wherein the ends of each cord are tied to each other.

10. The joint of claim 8 wherein the tubular member has a tapered diameter and at least some of the hoops have successively reduced diameters.

11. The joint of claim 5 wherein there is one less guide member on each hoop than there are hoops in the joint and there are twice as many cords as there are guide members on each hoop.

12. The joint of claim 6 wherein there is one less guide member on each hoop than there are hoops in the joint and there are twice as many cords as there are guide members on each hoop.

13. The joint of claim 1 wherein the hoops are flexible.

14. The joint of claim 1 wherein the hoops are rigid.

15. The joint of claim 1 wherein the hoops are mounted internally of the tubular member.

16. The joint of claim 1 wherein the material is comprised of fabric with an impervious liner and the warp of the fabric is circumferentially orientated so that the more flexible direction of the fabric is axial.

17. The joint of claim 3 wherein the eyelets are comprised of Teflon to reduce friction.

18. A universal flexible suit joint for pressurized suits comprising:

a hollow substantially cylindrical flexible bellows extending along the length of the joint, the bellows having an axis and a purality of circumferential convolutions;

a plurality of spaced hoops mounted on the bellows, the hoops being substantially concentric with the bellows axis;

a plurality of equally spaced eyelets mounted on each hoop with the eyelets being in the same relative circumferential positions on each hoop;

a plurality of cords passing through the eyelets and around the bellows, each of said cords describing a substantially helical path with each cord passing through one eyelet on each hoop.

19. A universal flexible suit joint for pressurized suits comprising:

a substantially cylindrical flexible bellows extending along the length of the joint, the bellows having an axis and a plurality of substantially circumferential convolutions and the bellows acting to seal the joint;

a plurality of equally spaced rigid hoops secured to the convolutions of the bellows, the hoops acting to maintain the circular shape of the joint, to prevent the bellows from collapsing under external pressure, and to support the bellows against the internal pressure of the pressurized suit;

a plurality of equally spaced eyelets mounted on each hoop with the eyelets being in the same relative circumferential positions on each hoop;

a plurality of cords passing through said eyelets and around the cylindrical bellows, each of said cords describing a substantially helical path with each cord passing through one eyelet on each hoop; and a substantially cylindrical covering extending around the outside of the joint to protect the joint.

20. The joint of claim 1 wherein said cords are wound in a substantially helical path such that half the number of cords pass in a clockwise direction and the remaining cords pass in a counterclockwise direction.

21. The joint of claim 6 wherein the number of guide members on each hoop is half the number of spaces between hoops in the joint and there are twice as many cords as there are guide members on each hoop.

22. The joint of claim 6 wherein there is one less guide member on each hoop than there are hoops in the joint and the cords are continuous and number the same as guides per hoop.

23. The joint of claim 6 wherein the number of guide members on each hoop is half the number of spaces between hoops in the joints and the cords are continuous and number the same as guides per hoop.

References Cited

UNITED STATES PATENTS

| | | | |
|---|---|---|---|
| 2,335,475 | 11/1943 | Beall | 2—2.1 XR |
| 2,720,221 | 10/1955 | Neilson | 138—122 |
| 2,852,216 | 9/1958 | Peters | 138—121 XR |
| 2,865,403 | 12/1958 | Vantine | 138—121 |
| 2,894,535 | 7/1959 | Hansen | 138—121 |
| 2,898,940 | 8/1959 | Cole | 138—121 |
| 2,954,562 | 10/1960 | Krupp | 2—2.1 |
| 3,006,662 | 10/1961 | Katsuhara | 138—121 XR |

LAVERNE D. GEIGER, *Primary Examiner.*

B. KILE, *Assistant Examiner.*

PO-1050
(5/69)

UNITED STATES PATENT OFFICE
CERTIFICATE OF CORRECTION

Patent No. 3,406,723      Dated October 22, 1968

Inventor(s) Robert W. Cornell

It is certified that error appears in the above-identified patent and that said Letters Patent are hereby corrected as shown below:

In Column 1, after the Abstract of the Disclosure, add the following paragraph:

-- Origin of the Invention

The invention described herein was made in the performance of work under a NASA Contract and is subject to the provisions of Section 305 of the National Aeronautics and Space Act of 1958, Public Law 85-568 (72 Stat. 435; 42 U.S.C. 2457).--

SIGNED AND
SEALED

SEP 30 1969

(SEAL)
Attest:

Edward M. Fletcher, Jr.
Attesting Officer

WILLIAM E. SCHUYLER, JR.
Commissioner of Patents